(12) United States Patent
Strikhalev

(10) Patent No.: US 8,904,346 B1
(45) Date of Patent: Dec. 2, 2014

(54) METHOD AND SYSTEM FOR AUTOMATED LOAD TESTING OF WEB APPLICATIONS

(71) Applicant: "Intermind" sociétéà responsabilité limitée, Luxembourg (LU)

(72) Inventor: Alexander Strikhalev, Moscow (RU)

(73) Assignee: "Intermind" sociétéà responsabilité limitée, Luxembourg (LU)

( * ) Notice: Subject to any disclaimer, the term of this patent is extended or adjusted under 35 U.S.C. 154(b) by 46 days.

(21) Appl. No.: 13/792,779

(22) Filed: Mar. 11, 2013

(51) Int. Cl.
*G06F 9/445* (2006.01)
*G06F 11/36* (2006.01)

(52) U.S. Cl.
CPC .................................. *G06F 11/3688* (2013.01)
USPC .......................................... 717/108; 717/114

(58) Field of Classification Search
None
See application file for complete search history.

(56) References Cited

U.S. PATENT DOCUMENTS 6,701,514 B1 * 3/2004 Haswell et al. ............... 717/115

* cited by examiner

*Primary Examiner* — Chuck Kendall
(74) *Attorney, Agent, or Firm* — Bardmesser Law Group

(57) ABSTRACT

A method for an automated load testing of server applications. The method employs load testing of a server part of a web application by execution of a client part of a web application inside a Runtime Environment, instead of an execution inside a browser. This allows for launching of a large number of client applications simultaneously and creating significant server traffic (i.e., server load). Running the application inside the Runtime Environment minimizes the resources required for multiple launches of thousands of applications in parallel. The proposed method allows for application developer to control test scenarios and effectively process the server responses.

12 Claims, 7 Drawing Sheets

METHOD AND SYSTEM FOR AUTOMATED LOAD TESTING OF WEB APPLICATIONS

BACKGROUND OF THE INVENTION

1. Field of the Invention

The present invention relates to testing of applications, and more particularly, to load testing of web applications running on a server.

2. Description of the Related Art

Currently, there are a number of conventional methods for load testing of web applications. A typical web application consists of a client part executed by a browser and a server part executed on a remote server. The server receives requests from a client and response to them. A load on a server can vary depending on a type of requests, a number of requests, request frequency, number of users that use the application at any one time, etc.

In order to determine how the server reacts to peak loads, the load testing (or stress testing) is used. As a result of this testing, a server response time under various loads can be determined. Conventional methods for an automated load testing of web applications use a number of approaches. One is launching a plurality of browser instances each of which "plays" some usage scenario that has been "prerecorded" with a help of specialized software, such as Selenium, see http:**seleniumhq.org/. Another one is recording network traffic generated by a browser while testing an application and applying the recorded traffic to a required number of emulated users.

In other words, all conventional load testing systems can be divided into two classes: systems that launch a plurality of browsers, and systems that emulate network traffic. Both of these systems have certain disadvantages and shortcomings. The load testing systems that launch a plurality of browsers are limited by resources of a computer used for testing, because a browser is a resource-consuming component. Thus, running thousands of browsers for load testing is not always possible. Furthermore, while a browser uses most of its resources for rendering and processing of a user interface of a tested application, these features cannot be turned off, so the resources usage remains high. In some cases, a browser can be run without GUI (a head-less mode). In such mode, the browser still renders user interface of web application but it is not shown on the screen. This makes browser consumes less (but still significant amount of) computational power.

The load testing systems that emulate network traffic are limited in terms of flexibility of the testing scenarios. These systems also do not provide accurate analysis of server responses and analysis of behavior of a client portion of the application. The client part of web application interacts with server part according to logic that was programmed by a software engineer. The logic can be quite complicated and tends to evolve over time. In a traffic emulation approach, traffic has to be re-recorded each time a change is made in the logic of the web application. But even having up to date traffic record might be not enough to emulate this scenario reliably for some usage scenarios. The authentic client can produce network traffic that can vary from run to run or can vary due to a change in conditions (such as network failures, network timeouts and so on). All this might lead to a change in set/order/content of network requests that authentic client sends, and makes our prerecorded traffic useless.

Some traffic recording systems provides some kind of scripting languages that can be used to repeat the logic of authentic client, but that would mean that two such systems have to be supported.

Accordingly, there is a need in the art for an effective and efficient method for load testing of web applications.

SUMMARY OF THE INVENTION

The present invention relates to automated load testing, and more particularly, to load testing of web applications running on a remote server that substantially obviates one or more of the disadvantages of the related art.

In one aspect, there is provided a method for an automated load testing of server applications. The method employs load testing of a server part of a web application by execution of a client part of a web application outside a browser inside a Runtime Environment emulating browser's API.

This allows for launching of a large number of client applications simultaneously and creating significant server traffic (i.e., server load). Running the application inside the Runtime Environment minimizes the resources required for multiple launches of thousands of applications in parallel. The proposed method allows for application developer to control test scenarios and effectively process the server responses.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS OF THE INVENTION

Reference will now be made in detail to the embodiments of the present invention, examples of which are illustrated in the accompanying drawings.

A method, system and computer program product for server application load testing is provided. The method, in accordance with an exemplary embodiment, provides for load testing of web applications running on a remote server.

According to the exemplary embodiment, the method employs load testing of a server part of a web application by execution of a client part of a web application inside a Runtime Environment, instead of an execution inside a browser. This allows for launching of a large number of client applications simultaneously and creating significant server traffic (i.e., server load).

Running the application inside the Runtime Environment minimizes the resources required for multiple launches of thousands of applications in parallel. The proposed method allows for application developer to control test scenarios and effectively process the server responses. According to the exemplary embodiment, the system can use a control application (i.e., a Test Management), which sends business commands of a certain type launched by a test application. The Test Management is a kind of "mission control center", which maintains desired load during specified amount of time. It also monitors system health (looks for and reports failed tests).

A Runtime Environment—system implementing the core behavior of program written in a specific computer language. It is used for emulating browser environment for the application.

Figure 1:
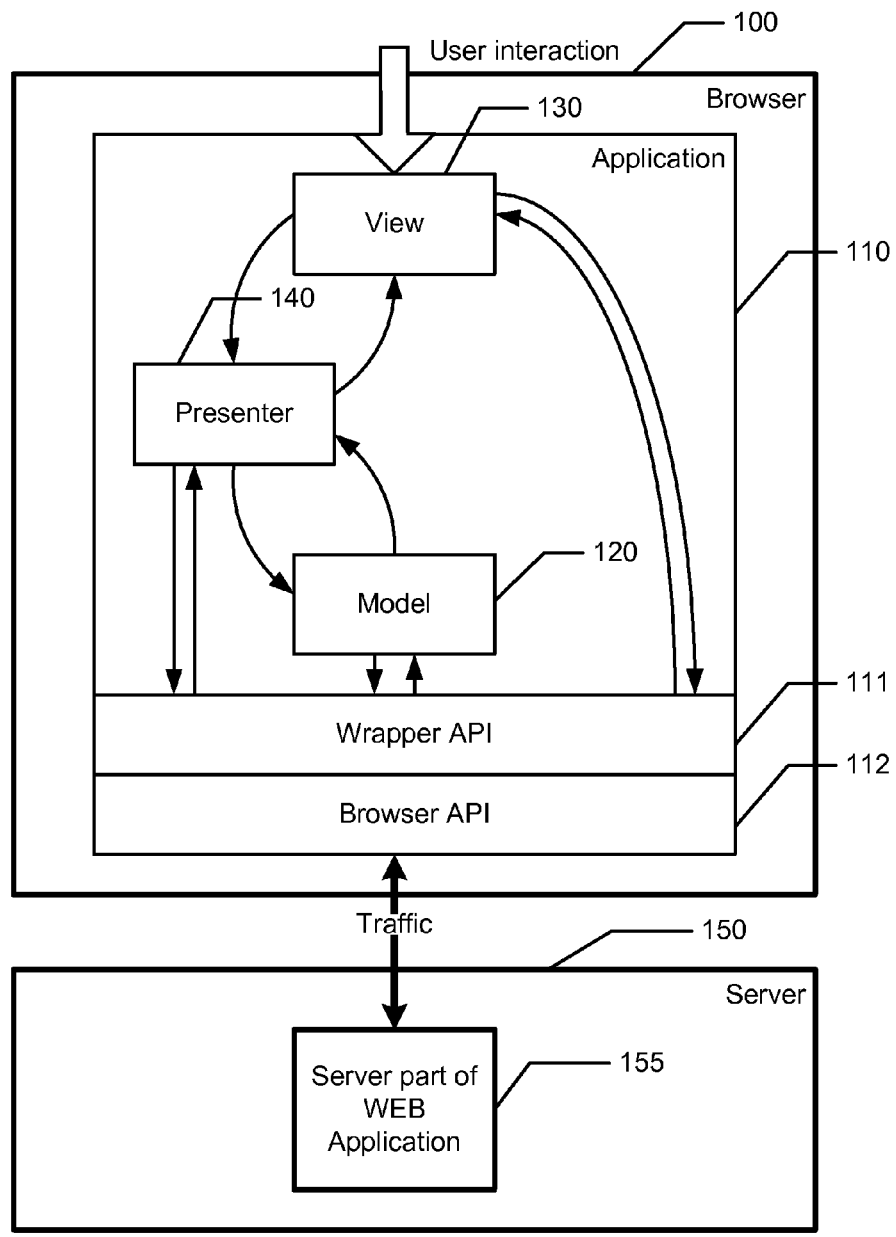
FIG. 1 illustrates a Model-View-Presenter (MVP) scheme used with a browser.

A client part of a web application is implemented using Model-View-Presenter (MVP) approach depicted in FIG. 1. A browser 100 runs an application 110 loaded from a web server 150 running a server part of the web application 155. A specific subject data is loaded into a model module 120, which keeps it synced with the server. A user interacts with a view module 130, which implements a user interface. A presenter module 140 implements business logic by controlling the model 120 and the view 130. The modules 120, 130 and 140 interact with a browser API 112 via a wrapper API 111 in order to process application data.

A common approach used for developing web applications is a Google Web Toolkit (GWT). The GWT is a Java-based framework, which allows Java developers to create Ajax applications without in-depth knowledge of JavaScript and browser processing. A JavaAPI is provided to the developers. This API allows for creation of web applications without working directly with the JavaScript.

The GWT compiler cross-compiles a Java code into an optimized JavaScript, which automatically works in all modern browsers. The GWT compiler performs a complete statistical analysis and code optimization while creating a highly optimized JavaScript. A server connection is implemented via a GWT Remote Procedure Call (RPC). The RPCs provide for Java object exchanges between a client and a server. A special interface indicates remote methods to be called. When a remote method is called, the GWT RPC serializes parameters, calls a corresponding method on the server and de-serializes returned values for a client code.

The GWT application includes a client and a server parts. Note that the client code is transformed into JavaScript. The compilation of the client code does not depend on the server code. Typically, the server part of the application is implemented in Java. However, it can be implemented using other languages. A server part of the GWT application can be tested by the load testing method.

Figure 2:
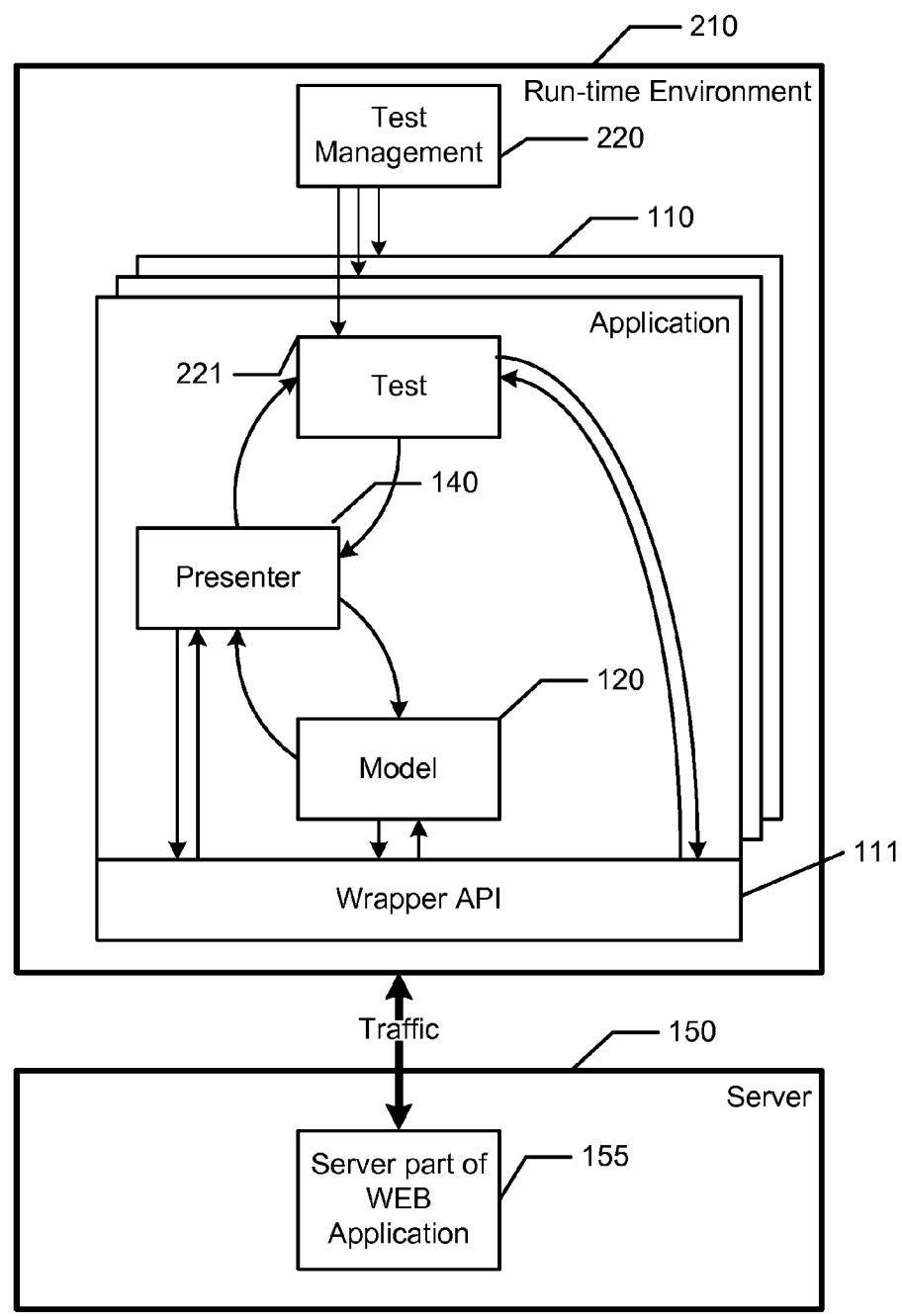
FIG. 2 illustrates the tested application(s) executed inside a Runtime Environment, in accordance with the exemplary embodiment.

According to the exemplary embodiment, the method employs load testing of a server part of a web application by execution of a client part of a web application inside a Runtime Environment. This provides significant advantages in case when the Presenter module 140 is very large (and/or complex) and implements complex business logic of large applications. In this case, only execution of the Presenter module 140 can generate a significant server load. However, the View module 130 is not large and can be replaced by a test mode (see FIG. 2) for controlling the test scenarios, as shown in FIG. 2. The View module 130 is a user interface, which transforms user's input (from keyboard and mouse) into commands, which are executed by the Presenter module 140. The Presenter module 140 sends data to View module 130 that it displays on the screen. During load testing, the View module 130 is replaced with the Test module, which simulates some usage scenarios by sending corresponding commands to the Presenter module 140. The Presenter module 140 executes command as if they came from the authentic View module 130.

In FIG. 2, the client application(s) 110 is executed inside a Runtime Environment 210. The View module 130 (see FIG. 1) is replaced by a Test module 221 for automated control of testing scenarios (i.e., emulation of user actions). The wrapper API 111 libraries are modified so the libraries address the server 150 directly from the Runtime Environment 210 instead of the browser. A number of threads can be launched in the Runtime Environment 210, each thread represents an instance of the application. Alternatively, a Test Management application 220 can be used for controlling the test scenarios.

Figure 3:
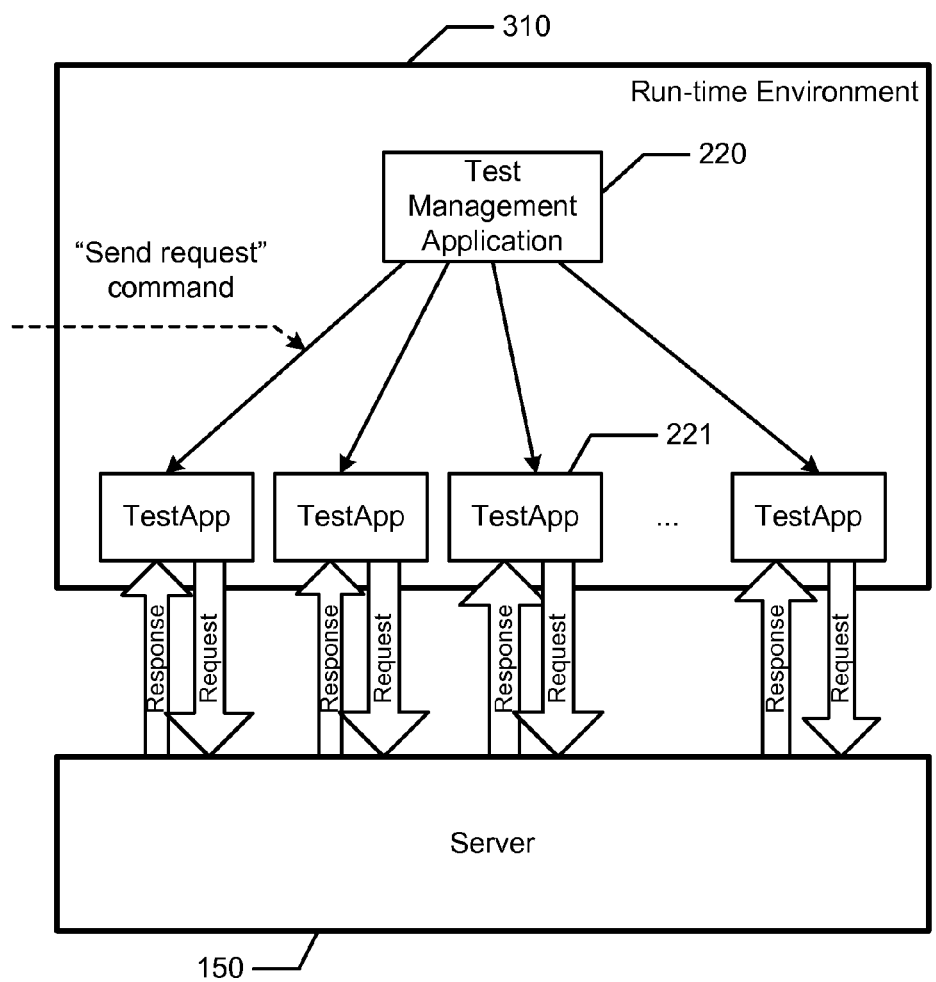
FIG. 3 illustrates test applications launched within a Runtime Environment, in accordance with the exemplary embodiment.

According to the exemplary embodiment, the GWT applications can be launched within a Java Runtime Environment (JRE) (for example, including libraries and Java Virtual Machine (JVM), or other byte code interpreters) as shown in FIG. 3. A management application 220 controls test applications 221 running inside a JRE 310. The test applications 221 send requests to the server 150 and receive and analyze the server responses.

The GWT is a set of libraries. The GWT libraries contain wrapper-redirector classes for redirecting over low-level javascript-interfaces of the browser. Thus, the libraries do not contain required functionality, but only implement the low level calls using the browser functionality instead. Thus, if the GWT application is launched inside the JRE, the GWT libraries generate an error, because the library does not contain a required functionality. Thus, the existing GWT libraries (or the wrapper API libraries) need to be modified.

Figure 4A:
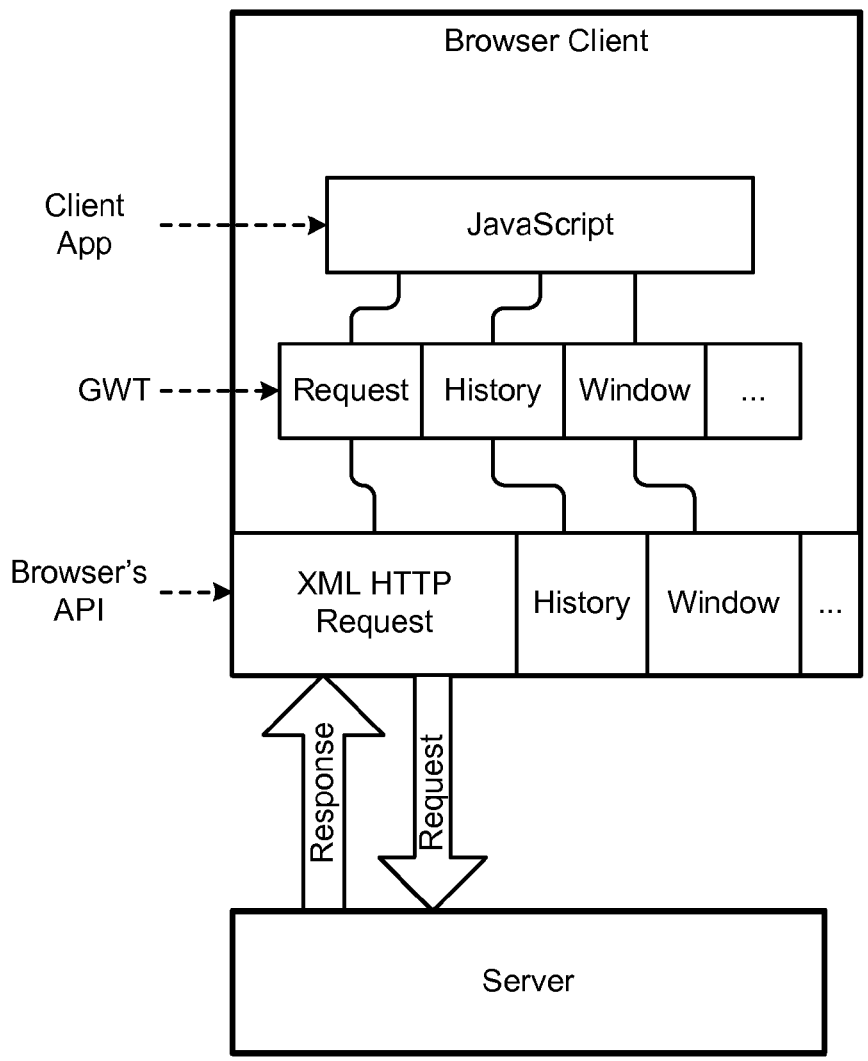
FIG. 4A illustrates an implementation using the browser API and FIG. 4B illustrates using modified Google Web Toolkit (GWT) libraries, in accordance with the exemplary embodiment.
Figure 4B:
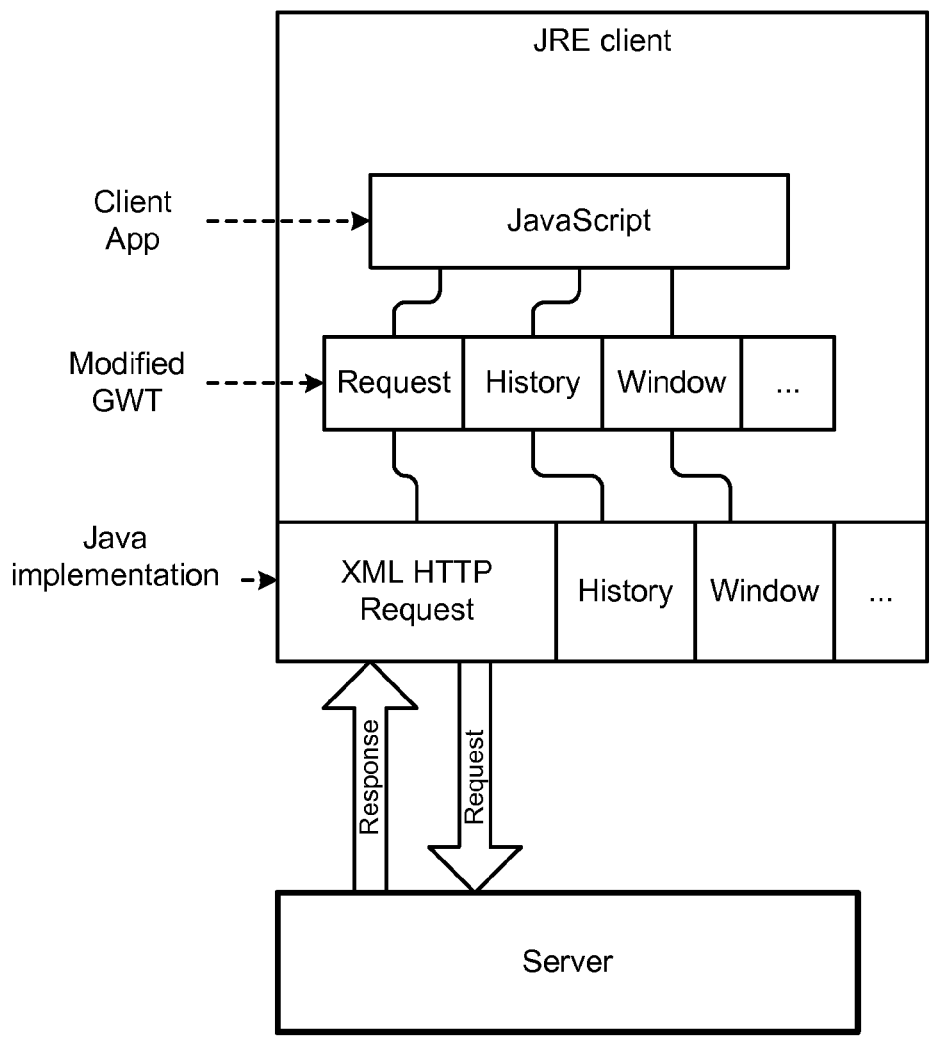

According to the exemplary embodiment, the existing GWT libraries (or the wrapper API libraries) are modified by implementing the missing functionality using Java. FIG. 4A illustrates an implementation using the browser API and FIG. 4B illustrates using modified GWT libraries in accordance with the exemplary embodiment.

In FIG. 4A, which shows an example of cookie manipulation, class Cookies from a standard GWT library is implemented as follows:

```
public class Cookies
{
public static void removeCookie(String name, String path)
    {if (uriEncoding) {name=uriEncode(name); } remove-
    CookieNative(name, path);
}
public static native void removeCookieNative(String
    name, String path)/*-{$doc.cookie=name+"=;path="+
    path+";expires=Fri, 2 Jan. 1970 00:00:00 GMT";}-*/;
```

Code written using GWT and working inside the browser results in execution of a JavaScript code reflected in special comments (/*-{ }-*/). In other words, an internal (to the browser) object $doc.cookie has a special value, which results in deletion of a particular browser cookie. The way the browser controls the cookie is only known to the browser developers. The important fact is that the cookie is deleted from the browser.

According to the exemplary embodiment depicted in FIG. 4B, the same class is implemented as follows:

public class Cookies {
    public static void removeCookie(String name, String path) {for (Cookie cookie:
    Context.getCurrentContext( )getCookies( )) {if (name.equals(cookie.getName( )) && (path==null || path.equals(cookie.getPath( ))) {
    Context.getCurrentContext( )getCookies( )remove( cookie);}}}

According to the above solution (FIG. 4B) implemented in the JRE, the cookie is deleted from a proprietary internal collection. In other words, the cookie is deleted without involving browser functionality. Thus, from the application's point of view, whether the application is executed inside the browser or inside the JRE, the application calls the GWT library method removeCookie(String name, String path) and removes the cookie.

Figure 5:
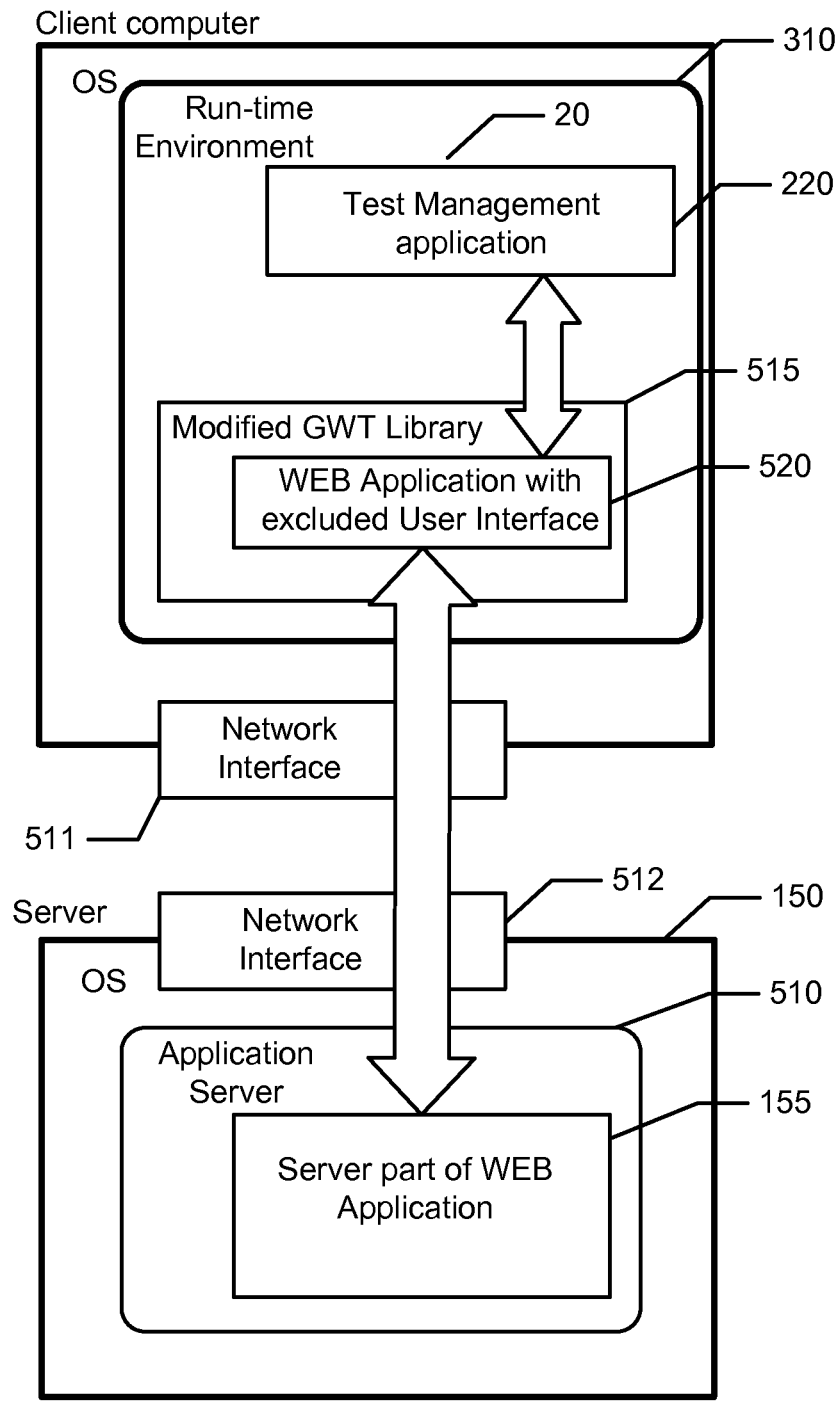
FIG. 5 illustrates a load testing system, in accordance with the exemplary embodiment.

According to the exemplary embodiment, other browser-dependent functionality can be replaced as well. FIG. 5 illustrates a load testing system, in accordance to the exemplary embodiment. A client computer 20 is connected to the server 150 via respective network interfaces 511 and 512. A test management application module 220 is implemented on a JRE 310. A JRE 310 is launched on a client OS. A client part 520 of a corresponding server part of the web application 155 (running on an application server 510) runs on a modified GWT library 515. Note that the tested web application 520 has a View module (which is responsible for user interface) substituted with a corresponding Test module (which emulates required usage scenario). To make such a substitution possible, the client part of web application should be written using well known Dependency Injection pattern (see http://**en.wikipedia.org/wiki/Dependency_injection).The test management module 220 controls execution scenarios of the application 520 executed within the JRE 310.

A browser has JavaScript objects that serve as layer between the kernel and the document object model. The browser JavaScript objects control browser windows and support the following functionality:

control of the frames;
    code delays or delayed cycles;
    supporting system dialogs;
    work with http cookies;
    page viewing history;
    control of monitor parameters;
    control of an open page address, etc.

Generally, a browser has a set of objects for implementing the above functionality. For example, the browser objects are: a window, a document, a location, a navigator, a history, an XML HTTP Request, etc.

For each of the browser objects the GWT either provides a high level access or provides a set of functions reflecting the properties and methods of the browser object to the developers. The main problem of launching of the GWT application inside the JRE is supporting remote procedure calls (GWT-RPC).

The GWT-RPC uses cookies, serialization/de-serialization of data and XMLHttpRequest. However, the GWT compiler does not work when the GWT application is launched inside the JRE. The GWT.create( ) method uses mechanism of delayed connection that does not work (generates an exception) inside the JRE because of the incapable GWT compiler. These problems are addressed by the exemplary embodiment.

According to the exemplary embodiment, the GWT.create( ) method is modified in order to work without delayed connection functionality. The HTTP request (Request.java) is modified so that XMLHttpRequest calls a Java implementation (see FIG. 4B). The Java implementation interacts with the server using HTTP protocol instead of calling the methods of a browser object XMLHttpRequest.

With regard to the access to the browser client cookies, the exemplary embodiment uses an internal collection of cookies and implements methods for working with the collections. According to the exemplary embodiment, the browser-based history is replaced by an internal history collection and a set of corresponding operations.[

Two users of a web application (i.e., two human beings) can work with the web application simultaneously only if they use two different browsers from two different computers. In other words, browsers of two real users are isolated and do not normally share any data. On the other hand, two virtual users (that are emulated with a help of the present invention) not only share one computer, they actually share the same memory (and, therefore, share that same data). To isolate emulated users, each of them is provided with a Context, which is an isolated storage (data structure), each instance of which is tied to one emulated user. Cookies, Timers and so on are stored in the Context, i.e., two emulated users have different Cookies and different Timers. Generally speaking Context is used to store any data that shouldn't be shared between emulated users.

According to the exemplary embodiment, the Java timer (Timer.java) is transferred into an application execution context for convenience. The Timer is a way to defer execution of a piece of code. GWT provides a Timer API (that relies on browser's Timer API). In the wrapper API, the browser's Timer API is substituted with Java's Timer API.

According to the exemplary embodiment, the application is executed in a special context. The context is used for multiple launches of the tested application inside the JRE and for implementing the browser functionality in the JRE. In other words, context is used to isolate multiple instances of the same application, and each instance has its own context. The application execution context is an execution environment used for particular application (i.e., application data and substituted browser objects). The context serves as a substitution of a browser window, inside which the application is executed. The context includes cookies, collections of timer events (one time and scheduled) and other system objects like History and XMLHttpRequest.

According to the exemplary embodiment, the client functionality is not tested in order minimize the load on the client computer. Also, the main goal of the preferred embodiment is to test the server part of the web application.

According to the exemplary embodiment, in order to perform efficient (by reusing web application code) automated load testing of the server part of the web application, an isolation of a client business code from a user interface is required. Delays between input events that are natural for human beings can be emulated using timers. Note that if the initial client application complies with the MVP design pattern (see FIG. 1), the test application can be written with minimal effort.

As will be appreciated, the code (and the logic) of authentic client applications can be reused in load tests, i.e., there is no need to rewrite it in a different language.

Figure 6:
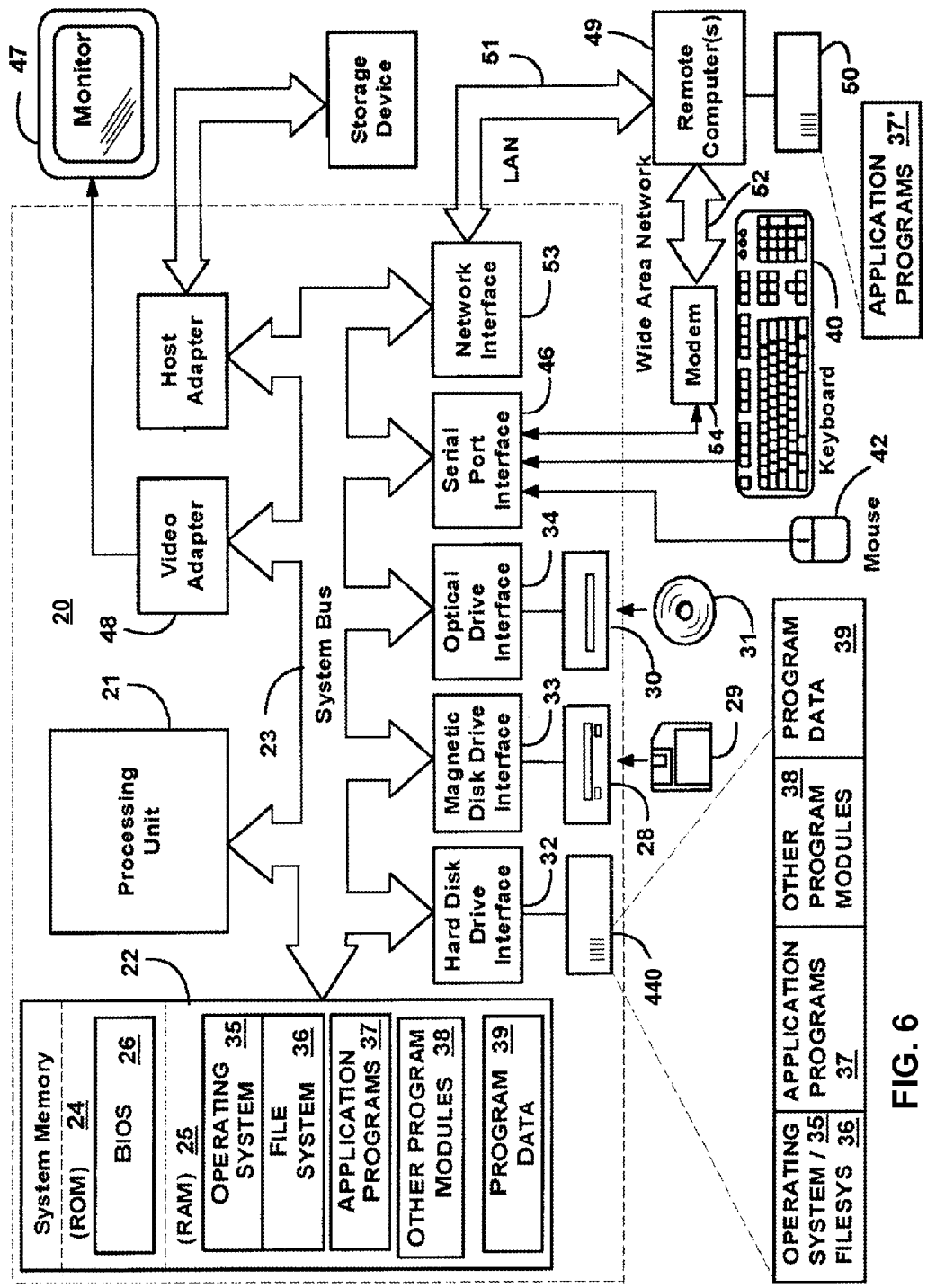
FIG. 6 illustrates a schematic diagram of an exemplary computer or server that can be used in the invention.

With reference to FIG. 6, an exemplary system for implementing the invention includes a general purpose computing device in the form of a personal computer 20 or server 150 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25.

A basic input/output system 26 (BIOS), containing the basic routines that help to transfer information between elements within the computer 20, such as during start-up, is stored in ROM 24. The personal computer 20 may further include a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., MICROSOFT WINDOWS OR LINUX). The computer 20 includes a file system 36 associated with or included within the operating system 35, such as the WINDOWS NT™ File System (NTFS), one or more application programs 37, other program modules 38 and program data 39. A user may enter commands and information into the personal computer 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48.

In addition to the monitor 47, personal computers typically include other peripheral output devices (not shown), such as speakers and printers. A data storage device, such as a hard disk drive, a magnetic tape, or other type of storage device is also connected to the system bus 23 via an interface, such as a host adapter via a connection interface, such as Integrated Drive Electronics (IDE), Advanced Technology Attachment (ATA), Ultra ATA, Small Computer System Interface (SCSI), SATA, Serial SCSI and the like.

The computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the computer 20.

The computer 20 may further include a memory storage device 50. The logical connections include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46.

In a networked environment, program modules depicted relative to the personal computer 20, or portions thereof, may be stored in the remote memory storage device. It will be appreciated that the network connections shown are exemplary and other means of establishing a communications link between the computers may be used.

Having thus described the different embodiments of a system and method, it should be apparent to those skilled in the art that certain advantages of the described method and apparatus have been achieved. In particular, it should be appreciated by those skilled in the art that the proposed method provides for an efficient load testing of remote web applications using Runtime Environment.

It should also be appreciated that various modifications, adaptations, and alternative embodiments thereof may be made within the scope and spirit of the present invention. The invention is further defined by the following claims.

What is claimed is:

1. A computer-implemented method for load testing of web applications, the method comprising:
(a) excluding a user interface from the web application and replacing the user interface with a test module;
(b) establishing a network connection between a server and a client;
(c) launching a Runtime Environment on the client, wherein the Runtime Environment substitutes for a browser environment normally expected by the web application;
(d) loading a modified Google Web Toolkit (GWT) library that supports remote procedure calls, into the Runtime Environment,
wherein the modified GWT library implements core browser behavior and maintains its own set of cookies, timers, substitute browser objects and history for each of the instances of the web application;
(e) instantiating a test management module into the Runtime Environment on the client;
(f) launching a plurality of instances of the web application in the Runtime Environment on the client;
(g) controlling execution of the instances of the web application inside the Runtime Environment by the test management module using the modified GWT library by sending requests to the web application,
wherein the test management module emulates various user actions and execution scenarios for the plurality of instances of the web application to generate load testing activities for load testing of the server.

2. The method of claim 1, wherein the Runtime Environment is a Java Runtime Environment.

3. The method of claim 1, further comprising launching a plurality of Runtime Environments on the client, wherein each Runtime Environment has its own set of web applications that are different from web applications in other Runtime Environments.

4. The method of claim 1, wherein the web application is implemented using Model-View-Presenter pattern or similar that separates the representation of information and user input from the business logic.

5. The method of claim 1, wherein the modified GWT library is modified to address the server directly from within the Runtime Environment.

6. The method of claim 1, wherein the test management module analyses server responses to the requests sent to the web application.

7. The method of claim 1, wherein cookies used by the instances of the web application are deleted from a proprietary collection by calling a remove cookie method.

8. The method of claim 1, wherein the Runtime Environment interacts with the server using HTTP protocol.

9. The method of claim 1, wherein the instances of the web application are executed in a special execution context.

10. The method of claim 1, wherein the server and a client are located on the same computer.

11. The method of claim 1, wherein the server and a client are located on different computers.

12. A system for load testing of web applications, comprising:
- a processor;
- a memory; and
- a computer program logic stored in the memory an executed on the processor, the computer program logic for executing steps (a)-(g) of claim 1.

* * * * *